United States Patent
Saar

[15] 3,693,647
[45] Sept. 26, 1972

[54] POSITIVELY ORIENTED, ADJUSTABLE LENGTH, BURIED VALVE OPERATOR AND INDICATOR SUPPORT

[72] Inventor: Robert P. Saar, Downers Grove, Ill.
[73] Assignee: Henry Pratt Company
[22] Filed: July 27, 1970
[21] Appl. No.: 58,524

[52] U.S. Cl. ................................................137/363
[51] Int. Cl. ..............................................F16l 5/00
[58] Field of Search..............137/556, 363, 368, 369

[56] References Cited

UNITED STATES PATENTS

| | | | |
|---|---|---|---|
| 380,308 | 4/1888 | Barry | 137/370 |
| 1,608,772 | 11/1926 | Cole | 137/365 |
| 2,046,330 | 7/1936 | Leoffert | 137/366 |
| 407,955 | 7/1889 | Kallaher et al. | 137/369 |
| 667,265 | 2/1901 | Tyler | 137/369 |
| 906,886 | 12/1908 | Jacob | 137/368 |
| 954,437 | 4/1910 | Jacob | 137/369 |
| 3,452,766 | 7/1969 | Fenster | 137/556 X |

Primary Examiner—Henry T. Klinksiek
Attorney—Hofgren, Wegner, Allen, Stellman & McCord

[57] ABSTRACT

In combination, a self-contained adjustable post for connecting an underground rotary valve to an above ground valve operator, valve position indicator, or the like. An elongated generally hollow housing portion, comprising a pair of relatively non-rotatable telescoped members, extends upwardly from the underground valve to ground level whereby the housing may be telescopically adjusted to accommodate rotary valves buried at variable depths. A connecting shaft portion, comprising a pair of relatively non-rotatable telescoped members, is disposed within the housing, connected at its lower end to the rotary valve shaft to rotate with the valve shaft, and extending at its upper end to ground level within the housing. The upper end of the connecting shaft and the housing are interconnected either directly or by means of the valve operator or valve position indicator whereby the length of the connecting shaft is automatically and simultaneously telescopically adjusted as the length of the housing is telescopically adjusted.

3 Claims, 6 Drawing Figures

PATENTED SEP 26 1972
3,693,647
SHEET 1 OF 2
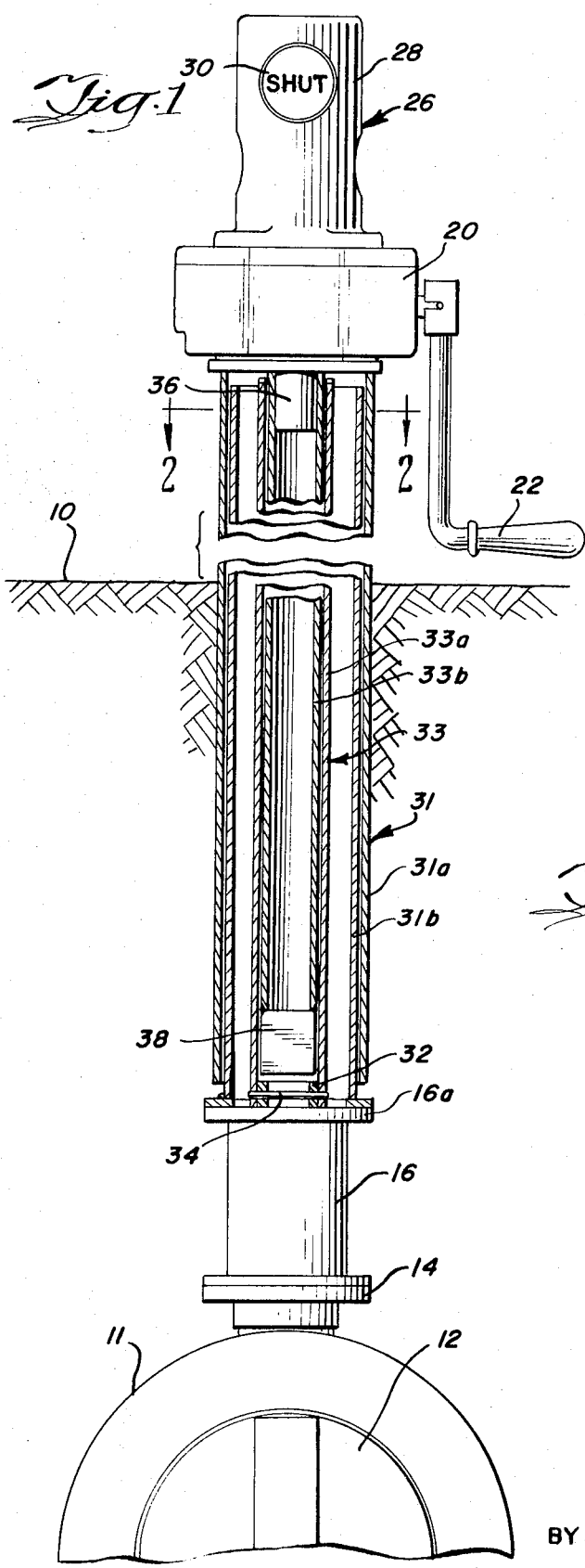
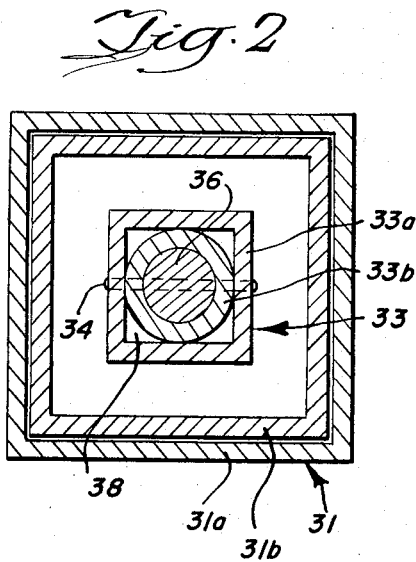
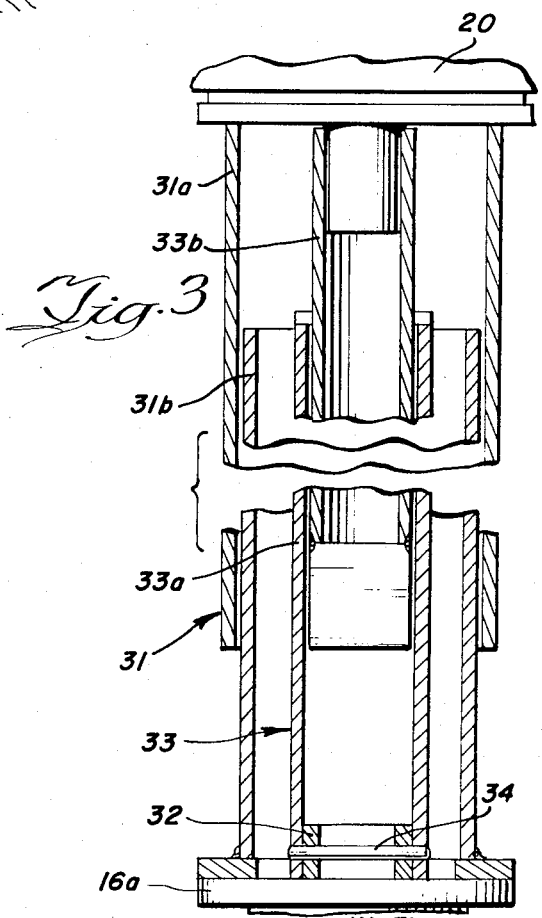
INVENTOR
Robert P. Saar
BY
ATTORNEYS

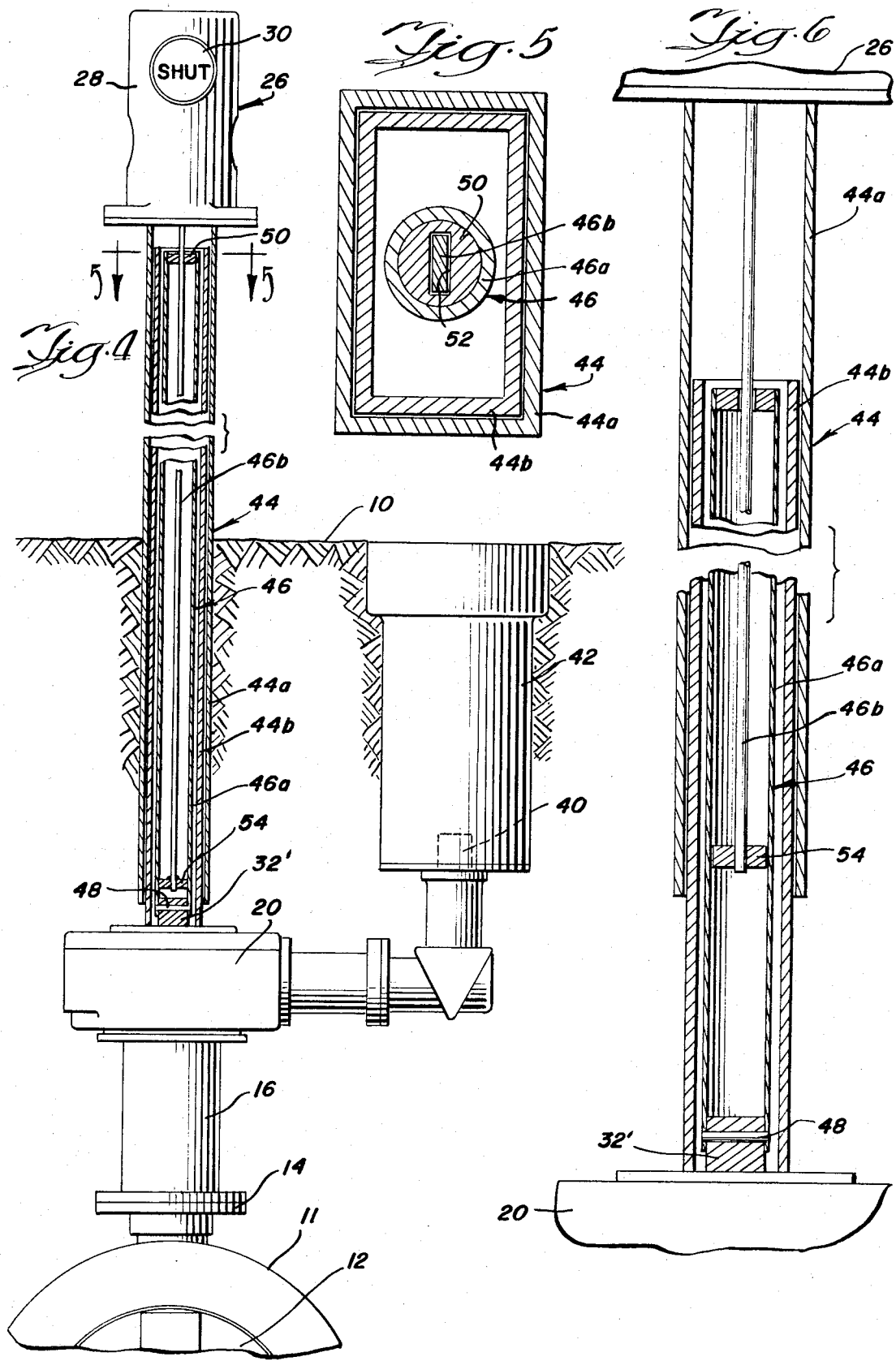

POSITIVELY ORIENTED, ADJUSTABLE LENGTH, BURIED VALVE OPERATOR AND INDICATOR SUPPORT

BACKGROUND OF THE INVENTION

This invention relates to an adjustable post which extends upwardly from an underground butterfly valve, or the like, used in the control of water lines to the water systems incorporated in many types of buildings. Many large installations require different burial depths for an underground or remotely placed valve, thus requiring different supporting and connecting post structures which extend upwardly from the buried valve to or above ground level. The various lengths of supporting and connecting posts must be figured by the installing contractor. Thus orders many times are placed after weeks and sometimes months have passed since the contractor was awarded the job. The result is a demand for fast delivery which places an enormous load on the shop facilities and scheduling of the suppliers. Furthermore, in many installations, the precise ground depth may not be known until the building is well into its initial construction stages, usually long after the contractor has made his calculations. There is a definite demand for an adjustable supporting and connecting post which extends upwardly from a buried underground valve to or above ground level for connection to the valve operator, valve position indicator, or the like.

SUMMARY OF THE INVENTION

An object of this invention is to provide an adjustable post for underground rotary valves.

Another object of the invention is to provide, in combination, a self-contained adjustable post for connecting an underground rotary valve, or the like, having an exposed underground rotary valve shaft, to an above ground valve operator, valve position indicator, or the like. The combination includes an elongated generally hollow housing portion extending upwardly from the underground valve to or above ground level, with the lower end of the housing surrounding the upper end of the rotary valve shaft, the elongated housing having means providing for adjustment of the length of the housing to accommodate rotary valves buried underground at variable depths. A connecting shaft is disposed within the housing, connected at its lower end to the rotary valve shaft to rotate with the valve shaft, and extending at its upper ends to ground level within the housing. The connecting shaft has means providing for adjustment of the length thereof within the housing so as to maintain the top of the connecting shaft generally at the top of the housing at any adjusted length of the housing.

In the preferred embodiment of the invention, the upper end of the connecting shaft is connected either directly or by means of a valve operator, valve position indicator, or the like, to the upper end of housing. The housing comprises a pair of telescoped members providing for adjustment of the length thereof and the connecting shaft comprises a pair of non-rotatably telescoped members providing for adjustment thereof whereby the length of the connecting shaft is automatically and simultaneously telescopically adjusted as the length of the housing is telescopically adjusted. The lower one of the telescoped members of the connecting shaft is fixed at its lower end to the rotary valve shaft and the upper one of said telescoped members of the connecting shaft is connected at its upper end to a valve operating means or valve indicating means whereby rotary valve shaft and valve operator or indicator rotate together.

Other objects, features, and advantages of the present invention will become apparent from the following detailed description taken in connection with the accompanying drawings.

DESCRIPTION OF THE DRAWINGS

FIG. 1 is an elevational view of a valve assembly which includes one form the adjustable post of the present invention in section shown in position in a pipeline system underground, the pipeline being removed to facilitate the illustration;

FIG. 2 is a horizontal section taken generally along the line 2—2 of FIG. 1;

FIG. 3 is a vertical section through the assembly of FIG. 1, in a position of adjustment in length greater than that shown in FIG. 1;

FIG. 4 is a view similar to that of FIG. 1 showing a modified form of the invention incorporated in a somewhat different type of valve arrangement, in a pipeline system underground;

FIG. 5 is a horizontal section taken generally along the line 5—5 of FIG. 4; and FIG. 6 is a vertical section through the assembly of FIG. 4, in a position of adjustment in length greater than that of FIG. 4.

DETAILED DESCRIPTION OF THE INVENTION

FIG. 1 illustrates a buried valve below ground level 10. The valve has a housing or body 11 within which a closure member or disc 12 is secured to a valve shaft journalled in appropriate bearings in the valve housing. Greater details of the structure may be seen by reference to Fenster U.S. Pat. No. 3,452,766 which issued on July 1, 1969, and entitled "Indicator Post Valve With Fair-Safe Feature." However, generally, the particular type of valve illustrated in the drawings is a butterfly valve wherein the valve member is of the wafer type mounted between opposite flanges of adjacent pipelines, the mounting being accomplished by a plurality of bolts joining the flanges and pulling them against the body of the valve. In the control of water pipelines to sprinkler systems, the pipeline may be at various depths below grade, usually no less than 2½ feet and being as much as ten feet below ground level.

The housing for the valve is provided with a platform 14 through which the valve shaft extends. The platform provides a mounting base for a spring retaining bonnet 16 on which is mounted the upstanding, vertically adjustable post structure of the present invention, to be described in greater detail hereinafter. A valve operator 20, provided with a crank 22, sits upon and is supported by the vertically adjustable post structure. A valve position indicator 26 is mounted upon the upper end of the operator for the purpose of giving visual indication for the position of the buried valve. Details of the valve position indicator 24 may be seen in the aforesaid Fenster U.S. Pat. No. 3,452,766. However, it should be pointed out that the valve position indicator has a pair of relatively rotatable members, namely a generally cylindrical outer cover 28 fixed to the top of the valve operator 20 and an inner generally cylindrical member 30 rotatably movable relative to the outer cover 28 in response to turning of the valve shaft, as will be apparent hereinafter.

The adjustable post structure of the present invention includes a support column portion, generally designated 31, which comprises an elongated generally hollow housing extending upwardly from the underground valve 12 to at least or above ground level 10, with the lower portion of the housing surrounding the upper end 32 of the rotary valve shaft, or a valve shaft extension which extends through the spring retaining bonnet 16. The housing 31 is comprised of a pair of telescoped members 31a, 31b for vertical adjustment to accommodate rotary valves buried at variable depths. As best seen in FIG. 1, the inner telescoped housing member 31b is fixed to a top flange 16a of the spring retaining bonnet 16. The upper end of the inner telescoped housing member 31b is free to move vertically relative to the outer housing member 31a. The outer telescoped housing member 31a is secured to the underside of the valve operator 20, with the lower end thereof free to move on the outside of and relative to the inner housing member 31b. As best seen in FIG. 2, the telescoped housing members 31a, 31b are generally rectangular in shape so that the two members are not relatively rotatable. Thus, it can be seen that the housing 31 is vertically adjustable by moving the outer telescoped housing member 31a upwardly relative to the inner housing member 31b to any height within the limits of the length of the two members to accommodate variable depths at which the rotary valve is buried. FIG. 1 shows the housing 31 at its shortest length.

The adjustable post further includes a connecting shaft portion, generally designated 33, somewhat similar to the housing 31. The connecting shaft portion is comprised of a pair of outer and inner telescoped members 33a and 33b, respectively, for vertical adjustment similar to the members 31a, 31b. The outer connecting shaft member 33a is generally rectangular in shape, as best seen in FIG. 2, and is pinned by a pin member 34 at the lower end thereof to the upper end 32 of the rotary valve shaft or valve shaft extension. The inner connecting shaft member 33b is generally cylindrical in shape, as seen in FIG. 2, and is fixed at its upper end to a depending shaft portion 36 extending downwardly from the valve operator 20. The shaft portion 36, through the valve operator 20, is connected for simultaneous rotation with the inner valve position indicating member 30. A generally rectangular nut 38, of a size to make driving connection between the nut and the outer connecting shaft member 33a, is fixed to the lower end of the inner connecting shaft member 33b. With this arrangement, a continuous rotary driving connection is made between the upper end 32 of the rotary valve shaft or valve extension, through the pin member 34 to the outer connecting shaft member 33a, from the outer shaft member 33a through the nut 38 to the inner connecting shaft member 33b, and from the inner shaft member 33b to the depending shaft portion 36 from the valve operator 20, and thus to the inner valve position indicating member 30, as described above. This driving connection between the valve 12 and the valve operator 20 (as well as the valve position indicator 26) remains uninterrupted during and notwithstanding the simultaneous vertical adjustment of the adjustable post which is comprised of the telescoped housing portion 31 and connecting shaft portion 33.

FIG. 3 shows the adjustable post of FIG. 1 in a position of adjustment wherein the post has been made longer than that shown in FIG. 1.

FIGS. 4 through 6 show a modified form of the invention incorporated in a somewhat different valve operating structure. Like numerals will be applied where applicable. Referring to FIG. 4, the valve and valve housing 12 and 11, respectively, and their connection to the spring retaining bonnet 16 is similar to that shown in FIG. 1. However, with the arrangement of FIG. 4, the valve operator 20 is disposed beneath ground level 10 on top of the spring retaining bonnet 16, with the rotary valve shaft or valve shaft extension 32' extending through the valve operator 20. An L-shaped extension of the valve operator extends to the side thereof and terminates upwardly in a square or rectangular nut 40 disposed at the bottom of a soil pipe 42 which extends upwardly to ground level. To operate the valve operator 20, an elongated wrench is inserted into the soil pipe 42 for engagement with the nut 40 to turn the same and thereby rotate the valve 12, through the valve operator 20.

In the embodiment shown in FIG. 4, the valve position indicator 26 is disposed on top of the adjustable post which extends from the top of the valve operator 20 to or above ground level.

The adjustable post shown in FIGS. 4 through 6 includes an outer support column or housing portion, generally designated 44, and an inner connecting shaft portion, generally designated 46. The housing portion of the adjustable post is similar to that shown in FIGS. 1 through 3 in that it comprises a pair of generally rectangular telescoped members 44a and 44b, as best seen in FIGS. 4 and 5. The outer housing member 44a is fixed at its upper end to the base of the valve position indicator 26 and the inner housing member 44b is fixed to the top of the housing for the valve operator 20.

The connecting shaft portion 46 of the adjustable post is disposed within the housing portion 44 and includes an outer cylindrical member 46a which is pinned at its lower end to the rotary valve shaft or valve shaft extension 32' by a pin member 48. A plug member 50, having a rectangular opening 52 (FIG. 5), is secured within the top of the outer connecting shaft member 46a. The connecting shaft portion 46 of the adjustable post includes a generally rectangular rod 46b operatively connected at its upper end to the inner rotatable member 30 of the valve position indicator 26 and extends downwardly therefrom through the complementary rectangular opening 52 in the plug member 50 and terminates at its lower end in a circular guide plug 54 which is generally disc shaped and has substantially the same diameter as the inside diameter of the connecting shaft member 46a.

FIG. 4 shows the adjustable post, comprising housing 44 and connecting shaft 46, in its shortest length of adjustment. To lengthen the post, the outer housing member 44a is moved upwardly relative to the inner housing member 44b to move the valve position indicator 26 upwardly relative to the valve operator 20 to accommodate different depths for the buried valve. Simultaneously, the inner rod 46b of the connecting shaft portion 46 moves upwardly with the valve position indicator 26 relative to the outer connecting shaft member 46a. FIG. 6 shows the adjustable post, comprising the housing portion 44 and the connecting shaft portion 46, in a position of adjustment with the post longer than that shown in FIG. 4.

In the embodiment of FIGS. 4-6, the driving chain from the rotary valve shaft or shaft extension 32' to the inner rotary member 30 of the valve position indicator 26 runs from the shaft or shaft extension through the pin member 48 to the outer connecting shaft member 46a and through the plug 50 at the top of the connecting shaft member 46a to the inner connecting shaft rod 46b and thus to the inner rotary member 30 of the valve position indicator 26. As with the embodiment shown in FIGS. 1 and 3, it is readily apparent that this driving connection is maintained during and notwithstanding adjustment of the telescoped adjustable post which comprises the housing portion 44 and the connecting shaft portion 46.

The foregoing detailed description has been given for clearness of understanding only and no unnecessary limitations should be understood therefrom as some modifications will be obvious to those skilled in the art.

I claim:

1. In combination, a self-contained adjustable post for connecting an underground rotary valve, or the like, having an exposed underground rotary valve shaft, to an above ground valve operator, valve position indicator, or the like comprising: an elongated generally hollow housing portion extending upwardly from the underground valve to ground level, with the lower portion of the housing surrounding the upper end of the rotary valve shaft, said elongated housing portion having means providing for adjustment of the length thereof to accommodate rotary valves buried at variable depths and comprising a pair of telescoped members providing for longitudinal adjustment, said telescoped members being keyed to each other for relative longitudinal sliding movement while precluding relative rotative movement therebetween; and a connecting shaft portion disposed within said housing and connected at a lower end to the rotary valve shaft to rotate with the valve shaft and extending at an upper end to ground level within the housing for connection to a valve operator, valve position indicator, or the like, said connecting shaft portion having means providing for adjustment of the length thereof within the housing to maintain the top of the connecting shaft generally at the top of the housing at any adjusted length of the housing and comprising a second pair of telescoped members within said first pair of telescoped members, said second pair of telescoped members being keyed to each other to allow longitudinal sliding relative movement and to preclude relative rotative movement therebetween, both of the members of said first pair having non-circular cross sections to key the same together and to prevent said relative, rotative movement, the members of said first pair further having rectangular, non-square, complementary cross sections.

2. The combination of claim 1 further including the valve position indicator mounted on the upper end of the uppermost one of said first pair of members and operatively associated with said connecting shaft portion.

3. The combination of claim 1 further including the combination valve operator and valve position indicator mounted on the upper end of the uppermost one of said first pair of members and operatively connected to said connecting shaft portion.

* * * * *